United States Patent Office 3,255,269
Patented June 7, 1966

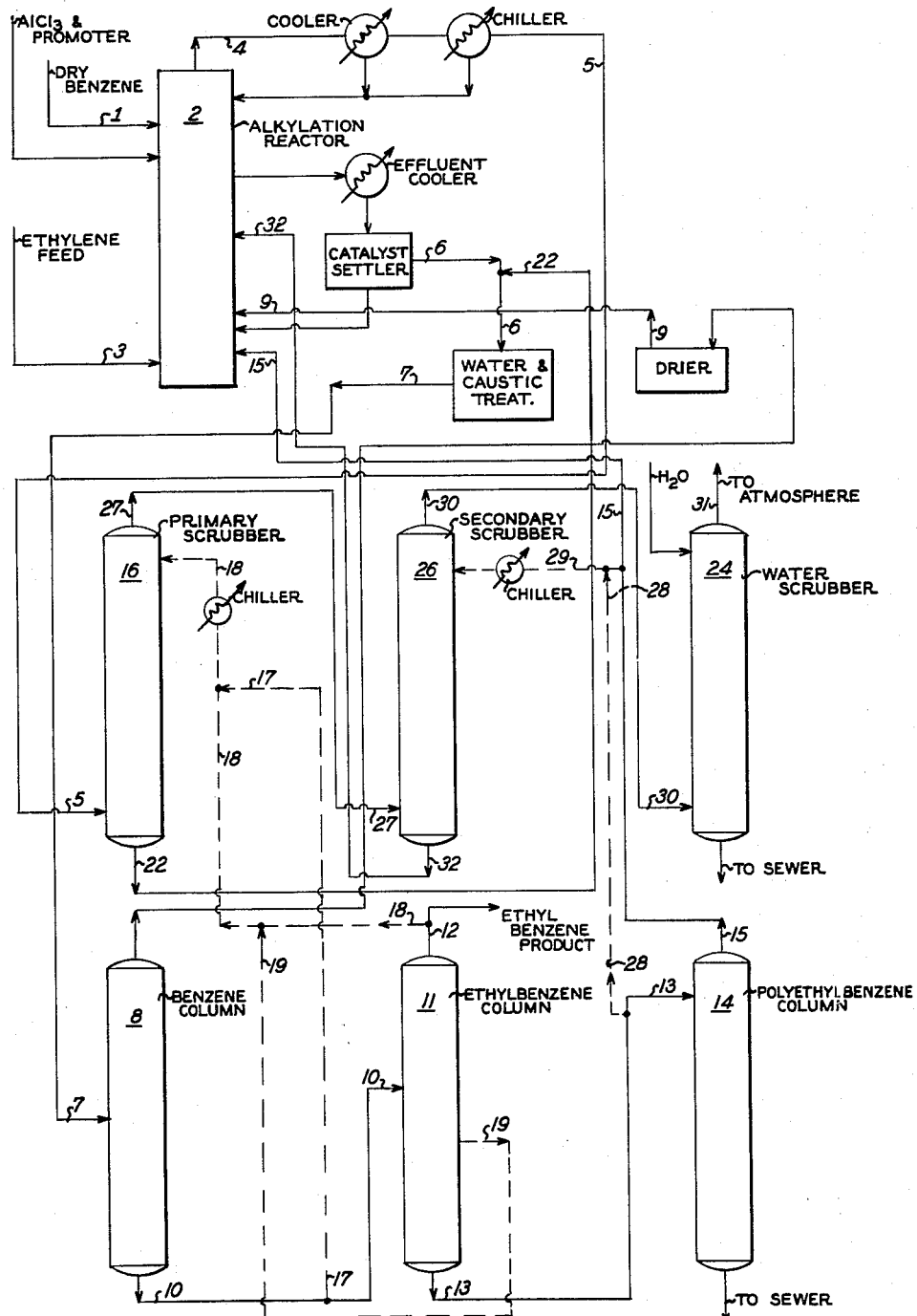

3,255,269
PROCESS FOR PREPARATION OF ETHYL-
BENZENE
Harold Gilman, Jackson Heights, Monroe Malow, Westbury, and Joel J. Kirman, Jackson Heights, N.Y., assignors to Halcon International, Inc., a corporation of Delaware
Filed Feb. 5, 1965, Ser. No. 430,722
3 Claims. (Cl. 260—671)

The present application is a continuation-in-part of copending application, Serial Number 210,688, filed July 18, 1962, now abandoned.

This invention relates to a process for the production of ethylbenzene. More specifically, it relates to a process wherein benzene and the ethylene contained in a dilute ethylene feedstock are reacted to form ethylbenzene; and to such a process wherein the inert gaseous reactor effluent saturated with hydrocarbon material is first chilled, the condensate being returned to the reactor, and then scrubbed in two sequential operations with process streams boiling above benzene; and wherein rich scrubber liquor is processed along with other plant streams to recover the hydrocarbons scrubbed from the gaseous reactor effluent streams.

The preparation of ethylbenzene by the reaction of ethylene and benzene in the presence of promoted aluminum chloride is well known. In general, ethylene is passed through liquid benzene containing catalyst and promoter; the reaction zone is maintained at low pressure and at substantially boiling temperature. Part of the reaction mixture is continuously withdrawn, settled, and the heavier catalyst phase returned to the reactor. The lighter alkylate phase is first treated with water and/or aqueous caustic and then distilled to separate: (1) unreacted benzene which is recycled to the reactor; (2) a product ethylzene fraction; (3) a polyethylbenzene material which is recycled to the reactor; and (4) a heavy polyethylbenzene residue which is discarded. More specific information with regard to catalyst, temperature of reaction and the like may be found in British Patents Nos. 631,874, 639,873, 640,040.

The alkylation process uses substantially pure ethylene or an ethylene material containing small amounts of inert gas. Large amounts of dilute ethylene feedstock, containing substantial proportions or even major portions of inert gas, are available at relatively low cost, but the usual refining method for producing a concentrated ethylene feedstock therefrom is expensive. It would therefore be economically desirable to use these dilute ethylene feed stocks directly in the alkylation of benzene.

Several problems arise, however, when a dilute ethylene feedstock is used in place of a concentrated ethylene feedstock. The inert gases which pass unconverted through the reactor zone carry from the benzene-filled, alkylation reactor considerable qualities of heat, both as sensible heat in the gases and as latent heat of vaporization in benzene and other hydrocarbons vaporized into the gas stream. As more dilute feeds are used, the reaction pressure must be increased or the reaction temperature decreased to minimize this heat loss. And for the same reason an increase in reaction temperature must be attended by an increase in reaction pressure.

Far more serious, however, is the problem of recovering hydrocarbons which have vaporized into the inert gas stream and which, if not recovered, would represent a severe economic loss to the process. Cooling and chilling the stream to condense out the vaporized hydrocarbon are only partial solutions, since a considerable quantity of hydrocarbon remains in the inert gas even after chilling it well below cooling water temperature. Reduction of reaction zone temperature to minimize vaporization is, within narrow limits, also a partial expedient. As reactor temperature is lowered, the rate of reaction is also lowered, so that a larger reactor volume is required to alkylate a given throughput of benzene. Similarly, the reaction pressure may be increased to minimize the amount of material which vaporizes. However, reactor cost rises as the pressure is increased.

It is an object of the present invention to provide a process whereby dilute ethylene feedstocks can be utilized for the production of ethylbenzene. And it is an object of the present invention to provide a process whereby these dilute feedstocks can be used without resorting to the expensive refining method required for producing a concentrated ethylene stream. It is a still further object of this invention to avoid any loss of yield on ethylene or benzene due to the use of a dilute ethylene feed stock.

It has been discovered that dilute ethylene feed stocks can be used economically in the production of ethylbenzene if the inert gas effluent from the alkylation reactor is scrubbed in two sequential operations with process streams boiling above benzene, to recover from the effluent the hydrocarbons contained therein.

And it has been discovered that these hydrocarbons can be reintroduced to the process so that there is no loss of hydrocarbon from the process.

In accordance with these inventive improvements to the art of alkylation the following process has been developed.

Dry liquid benzene, aluminum chloride catalyst, ethyl chloride or hydrogen chloride promotor, and various liquid recycle streams, hereinafter to be discussed, are introduced into a reaction zone. An inert gas stream, containing less than 60% by volume ethylene (the other components being largely methane, ethane and hydrogen), is bubbled into the reaction zone. Inert gases, saturated largely with benzene but containing also ethylbenzene and hydrogen chloride, are taken overhead from the reactor zone, cooled and then chilled. The condensate from the cooling and chilling operation is returned to the reactor while the inert gases, still bearing considerable benzene, are passed to the scrubbing system.

Liquid reaction mixture is withdrawn from the reaction zone, cooled, and passed to a settling tank. A heavy catalyst phase settles out and is recycled to the reactor. The remaining reaction mixture, after treatment with water and caustic, is fractionated into several recycle and product streams. Unconverted benzene is removed by distillation and after drying is recycled to the reactor. The bottoms from the benzene column are fractionated to remove a pure ethylbenzene overhead product and a crude polyethylbenzene bottoms product. The crude polyethylbenzene is fractionated to produce an overhead stream consisting essentially of di- and triethylbenzenes and a bottoms streams of polyethylbenzenes; the former is recycled to the reactor whereas the latter is discarded from the process.

The essence of the invention consists of two sequential scrubbing operations wherein the inert gases from the reactor effluent chiller are countercurrently contacted with two alkylated benzene streams to recover the benzene and ethylbenzene contained therein. The first scrubbing operation removes essentially all the benzene contained in the inert gas stream; the second scrubbing operation removes any ethylbenzene introduced into the inert gas stream in the first scrubber.

The first scrubbing operation uses as lean liquor a portion of a process stream consisting essentially of ethylbenzene. It is not feasible to use a polyethylbenzene stream to scrub out benzene from a large inert gas stream since the quantity of polyethylbenzene is usually too small to accomplish that purpose and excessive recycle of polyethylbenzene will adversely affect product distribution and yield.

The actual process streams contemplated for such are (1) benzene column bottoms; (2) ethylbenzene column product; (3) ethylbenzene column sidestream; or (4) a combination of one or more of these streams. Generally it is preferred to use a crude stream such as the benzene column bottoms rather than a finished product such as ethylbenzene. The suitable scrubbing liquors can be characterized as boiling in the range of 140° C. to 180° C. at atmospheric pressure.

The amount of lean liquor used is from 0.1 to 10.0 parts per part of inert gas and hydrocarbon fed to the first scrubber, but preferably is from 0.5 to 2.0 parts per part.

By deeper chilling of the inert gas fed to the scrubber or the lean liquor fed to the scrubber or both it is possible to operate closer to the lower end of the preferred liquor to gas rate. The inert gas may be chilled to from −20° C. to 30° C. but preferably is chilled to from 0° C. to 20° C. Similarly the lean liquor is preferably chilled to from 0° C. to 20° C.

Operation of the scrubbing system under higher pressures will also allow smaller lean liquor streams to be used. Pressures from 0 p.s.i.g. to 500 p.s.i.g. can be employed; preferably the pressure will be 5 to 50 p.s.i.g.

Rich scrubber liquor is returned to the water and caustic treatment step and is then redistilled in the benzene column along with fresh reactor effluent The inert gases from the first scrubber are essentially free of benzene but are saturated with ethylbenzene. This ethylbenzene is recovered in the second scrubbing operation wherein the inert gases are countercurrently contacted with a portion of a process stream consisting essentially of polyethylbenzene. The actual streams contemplated for such use are (1) ethylbenzene column bottoms; (2) polyethylbenzene column product; or (3) a combination of these streams: It is preferred to use the crude ethylbenzene column bottoms. The suitable liquor can be characterized as boiling in the range of 100° to 150° C. at 50 mm. Hg.

The amount of lean liquor used is from 0.05 to 5.0 parts per part of inert gas and hydrocarbon fed to the second scrubber, but preferably is from 0.1 to 1.0 times the weight.

The effects of chilling the lean liquor are the same as with respect to the first scrubbing operation; and the effect of pressure is also similar. The preferred ranges of pressure and temperature are 0 to 50 p.s.i.g. and 0° C. to 20° C. respectively. The rich liquor from the second scrubbing operation may be recycled directly to the alkylation reactor.

The inert gases passing out of the second scrubber contain small amounts of polyethylbenzenes, mostly diethylbenzene, and hydrogen chloride. The gases are passed through a final scrubber wherein they are countercurrently contacted with water to remove trace hydrogen chloride and then are vented to the atmosphere.

The accompanying drawing is a schematic illustration of the invention. The following explanation of the drawing and the examples which follow this explanation will indicate more fully the nature of the present invention.

Dry benzene is introduced via line 1 into reactor 2. Other feed streams to the reactor include aluminum chloride catalyst, promoter, and several recycle streams. A dilute ethylene feedstock is fed to the reactor via line 3. The ethylene reacts rapidly with the benzene to form ethylated benzenes. Reaction temperature is maintained about 95° C. and reactor pressure is about 15 p.s.i.g.

The inert gases pass through the reactor, becoming saturated therein with benzene and ethylbenzene and pass out via line 4 to a cooler and then a chiller, wherein a large portion of the organics are condensed. Condensate from the cooler and chiller is recycled to the reactor. Chilled inert gases, still bearing large amounts of benzene, are passed via line 5 to the scrubbing system.

Reaction mixture is withdrawn from the reactor, cooled, and passed to a settler wherein catalyst complex settles out and is returned to the reactor. The catalyst free effluent passes via line 6 to a water treatment step and a caustic treatment step wherein acidic components are removed and neutralized. Treated effluent then passes via line 7 to benzene column 8.

The benzene column is operated at about 30 p.s.i.g. Benzene is taken overhead via line 9, dried, and returned to the reactor. Bottoms from the benzene column consisting largely of ethylbenzene with some polyethylbenzenes are passed via line 10 to the ethylbenzene column 11. This column is operated at about 5 p.s.i.g. and removes ethylbenzenes product as an overhead via line 12 and crude polyethylbenzenes as a bottoms via line 13. The crude polyethylbenzenes are distilled in polyethylbenzene column 14, which is operated at about 50 mm. Hg absolute pressure, and wherein a relatively pure overhead cut consisting of di and tri ethylbenzenes and a bottoms cut of higher polyethylbenzenes and residue are removed. The overhead cut is recycled to the reactor via line 15 and the bottoms cut is discarded.

The hydrocarbon-saturated inert gases from the chiller pass via line 5 to primary scrubber 16. The lean scrubber liquor to the primary scrubber may be a portion of (1) benzene column bottoms supplied via line 17; (2) ethylbenzene column product supplied via line 18; (3) ethylbenzene column sidestream supplied via line 19; or (4) a combination of these streams.

The scrubbing operation is carried out in equipment well known to the art such as packed towers or tray towers and takes place at about 10 p.s.i.g. Lean scrubber liquor is chilled to about 15° C. prior to introduction into the scrubber; rich scrubber liquor is recycled to the caustic and water wash step via line 22.

Lean gases from the primary scrubber pass to the secondary scrubber 26, via line 27. The scrubbing liquor used in the secondary scrubber may be (1) ethylbenzene column bottoms supplied via line 28; (2) polyethylbenzene column product supplied via line 29; or (3) a combination of these streams. The lean liquor will usually be chilled to about 15° C. prior to introduction into the scrubber. Lean gases pass out of the scrubber via line 30 and are passed to the water scrubber from which they are vented to the atmosphere via line 31. Rich liquor from the secondary scrubber is recycled directly to the reactor via line 32.

*Example 1*

Benzene column bottoms, line 17, chilled to 60° F., are used as lean scrubber liquor in the primary scrubber and polyethylbenzene column overhead, line 29, chilled to 60° F., is used as lean scrubber liquor in the secondary scrubber. Lean gases from the secondary scrubber are passed to the water scrubber and then vented. The following tables (Tables I and II) set forth the flowrates and compositions of important streams and indicate their temperature and pressure conditions:

TABLE I.—FLOW RATE AND COMPOSITION OF PROCESS STREAMS IN LB./HR.

| Stream No. | 1 | 3 | Mol percent | 5 | 6 |
|---|---|---|---|---|---|
| Component: | | | | | |
| Hydrogen | | 268 | 19 | 268 | |
| Methane | | 4,390 | 40 | 4,390 | |
| Ethane | | 1,990 | 10 | 1,990 | |
| Ethylene | | 6,045 | 31 | | |
| Benzene | 16,458 | | | 1,593 | 23,769 |
| Ethylbenzene | | | | 21 | 21,726 |
| Diethylbenzene | | | | | 3,288 |
| Triethylbenzene | | | | | 698 |
| Polyethylbenzenes | | | | | 1,058 |
| HCl | | | | 79 | |
| Total | 16,458 | 12,693 | 100 | 8,341 | 50,539 |

TABLE I.—Continued

| Stream No. | 9 | 10 | 12 | 17 | 22 |
|---|---|---|---|---|---|
| Component: | | | | | |
| Benzene | 25,198 | 26 | 18 | 10 | 1,580 |
| Ethylbenzene | 202 | 30,254 | 21,250 | 8,995 | 8,767 |
| Diethylbenzene | | 4,660 | | 1,385 | 1,385 |
| Triethylbenzene | | 993 | | 295 | 295 |
| Polyethylbenzenes | | 1,506 | | 447 | 447 |
| Total | 25,400 | 37,439 | 21,268 | 11,132 | 12,474 |

| Stream No. | 27 | 29 | 30 | 31 | 32 |
|---|---|---|---|---|---|
| Component: | | | | | |
| Hydrogen | 268 | | 268 | 268 | |
| Methane | 4,390 | | 4,390 | 4,390 | |
| Ethane | 1,990 | | 1,990 | 1,990 | |
| Benzene | 23 | | | | 23 |
| Ethylbenzene | 249 | 11 | 11 | 11 | 250 |
| Diethylbenzene | | 3,275 | 40 | 39 | 3,234 |
| Triethylbenzene | | 698 | | | 698 |
| HCl | 79 | | 79 | | |
| Total | 6,999 | 3,984 | 6,778 | 6,833 | 4,205 |

TABLE II.—TEMPERATURES AND PRESSURES OF PROCESS STREAMS

| Stream No. | 5 | 17 | 22 | 27 | 29 | 30 | 31 | 32 |
|---|---|---|---|---|---|---|---|---|
| Temp., °F | 55 | 60 | 105 | 62 | 60 | 62 | | 135 |
| Pressure, p.s.i.g | 10 | | | 9 | | 8 | 6 | |

In view of the foregoing disclosures, variations and modifications thereof will be apparent to one skilled in the art, and it is intended to include within the invention all such variations and modifications except as do not come within the scope of the appended claims.

What is claimed is:

1. In a process for the preparation of ethylbenzene by the Friedel-Crafts reaction of liquid benzene with the ethylene contained in a feed stock containing less than 60% by volume ethylene; and wherein a liquid reaction effluent is formed, washed, neutralized and fractionated to separate (1) a benzene recycle stream, (2) a product ethylbenzene stream, and (3) a polyethylbenzene recycle stream; and wherein a gaseous reactor effluent, saturated with benzene and alkylated benzenes, is cooled and chilled to condense out part of the benzene and alkylated benzenes, the improvement which comprises: recovering residual hydrocarbons from the chilled gaseous reactor effluent by absorption in a lean liquor in two sequential scrubbing steps; the lean liquor in the first of said steps being a portion of at least one ethylbenzene rich process stream boiling above 140° C. and below 180° C. at atmospheric pressure; and the lean liquor in the second of said steps being a portion of at least one polyethylbenzene rich stream boiling above 100° C. and below 150° C. at 50 mm. Hg.

2. The process of claim 1 wherein the first of said two scrubbing operations uses as lean scrubber liquor, a portion of the benzene fractionator bottoms; and the second of said operations uses as lean scrubber liquor, polyethylbenzene recycle.

3. The process of claim 1 wherein the ethylene feed mixture contains from 30 to 50% by volume ethylene.

References Cited by the Examiner

UNITED STATES PATENTS 2,894,999  7/1959  Lawson _____ 260—671
2,985,583  5/1961  Gilmore _____ 208—101

FOREIGN PATENTS 640,040  7/1950  Great Britain.

DELBERT E. GANTZ, *Primary Examiner.*

PAUL M. COUGHLAN, *Examiner.*

C. R. DAVIS, *Assistant Examiner.*